United States Patent [19]

Hisatomi et al.

[11] Patent Number: 5,046,464

[45] Date of Patent: Sep. 10, 1991

[54] CLAMP FOR IGNITION CABLES

[75] Inventors: Masahiro Hisatomi, Kanagawa; Hiroyuki Itoh, Mie, both of Japan

[73] Assignees: Nissan Motor Co., Yokohama; Sumitomo Wiring System, Ltd., Yokkaichi, both of Japan

[21] Appl. No.: 501,131

[22] Filed: Mar. 29, 1990

[30] Foreign Application Priority Data

Apr. 7, 1989 [JP] Japan .............................. 1-41550[U]

[51] Int. Cl.[5] .......................... F02P 23/00; F02P 1/00; H02G 3/00

[52] U.S. Cl. .......................... 123/143 C; 123/169 PA; 174/72 A

[58] Field of Search .................... 123/143 C, 169 PA; 174/72 A

[56] References Cited

U.S. PATENT DOCUMENTS 2,997,531 8/1961 Oldham et al. ................... 174/72 A
3,342,168 9/1967 Burdette ....................... 123/169 PA
3,846,575 11/1974 Troy ................................ 174/72 A
4,771,743 9/1988 McDowell ...................... 123/143 C

FOREIGN PATENT DOCUMENTS 61-167479 10/1986 Japan .

*Primary Examiner*—Tony M. Argenbright
*Assistant Examiner*—Robert E. Mates
*Attorney, Agent, or Firm*—Wenderoth, Lind & Ponack

[57] ABSTRACT

A clamp for ignition cables has a band-like clamp holder tightly wound around the body portion of a rubber ignition plug cap enclosing the end portion of an ignition cable and has inserting and fixing portions provided on the outer circumference thereof, and has clamp pieces each having an inserting and fixing leg piece designed to be inserted so as to be releasably fixed in the respective inserting and fixing portions in a locking manner and has cord holding portions with a cord inserting port provided at the upper portion thereof. These clamp holder and clamp pieces are formed from a non-rubber rigid material. The clamp pieces are inserted into the clamp holder tightly engaged around the body portion of the ignition plug cap so as to be fixed and locked therein in an erect fashion. Ignition cables are then inserted into the cord holding portions and fixedly held therein.

6 Claims, 4 Drawing Sheets

CLAMP FOR IGNITION CABLES

BACKGROUND OF THE INVENTION

1. Field of the Invention

The present invention relates to a clamp for use in clamping an ignition cable in position that is provided to connect an electrode of a distributor of an internal combustion engine mounted on an automotive vehicle or the like with an ignition plug of the internal combustion engine.

2. Prior Art

One of the wide range of applications of ignition cables is for automotive vehicles. In automotive vehicles, a number of ignition plugs are employed, and this involves complicated wiring of ignition cables. In addition, ignition cables are subject to vibrations and heat generated in a high temperature atmosphere. In these circumstances, with a view to obtaining stable functions of ignition cables clamps are used to put wiring of ignition cables in good order, as well as holding the same in position. In general, in a widely employed ignition cable clamping structure, clamps are provided on a rocker arm cover separately in such a manner as to stand erect therefrom, and each ignition cable is clamped to be held at an intermediate position along the length thereof by an associated clamp.

However, this commonly used ignition cable clamping structure is disadvantageous in that it involves a need for machining of the rocker arm cover so as to make it possible to provide clamps in such a manner as to stand erect therefrom, and requires metal fixtures for fixing clamps so provided on the rocker arm cover. With a view to solving the above problem, the official gazette of Japanese Utility Model Laid-Open No. 167479/86 discloses an ignition cable clamping device adapted to eliminate a need for provision of clamps on the rocker arm cover. In this clamping device, a notch is formed in the clamp portion integrally provided on a rubber ignition plug cap (hereinafter, simply referred to as plug cap) enclosing the end portion of an associated ignition cable in such a manner as to protrude therefrom, and another ignition cable passing by this plug cap is designed to be held by this notch.

In this clamping device comprising a notch formed in the clamp portion integrally provided on the plug cap, since the clamp portion in which a notch is formed is formed as an integral portion of the rubber plug cap, basically the clamp portion for holding an ignition cable also comprises an elastic member.

Due to this construction, the conventional clamping device disclosed in the above-mentioned official gazette has the following drawbacks. In case where the frequency of vibrations of the engine on the ignition plug side does not coincide with that of vibrations of the ignition cable resiliently held in the clamp portion, vibrating stress is generated at the clamp portion serving as a point of contact between these two vibrations having different frequencies, and this tends to cause damage and/or deterioration of the clamp portion. In addition, the rubber clamp portion is subject to heat deterioration due to the high temperature atmosphere in which it is placed. This heat deterioration adds to with the vibrating deterioration, and this synergistic effect sometimes serves to quickly deteriorate the clamping capability of the clamp portion. Furthermore, since the plug cap and clamp portion are integrally formed, there is no possibility of varying the wiring layout of ignition cables, and hence this construction lacks flexibility to allow changes in a wiring layout of ignition cables.

SUMMARY OF THE INVENTION

An object of the present invention is to provide a clamp for ignition cables that enabloes the elimination of as much deterioration due to vibrating stress and heat as possible.

Another object of the present invention is to provide a clamp for ignition cables that can fully meet a need for change in a wiring layout.

A further object of the present invention is to provide a clamp for ignition cables that is easy to assemble and disassemble.

With a view to achieving the above-mentioned objects, the present invention provides a clamp for ignition cables comprising a band-like clamp holder tightly wound around the body portion of a rubber ignition plug cap enclosing one end of an ignition cable and having inserting and fixing protions provided on the outer circumference thereof, and clamp pieces each having an inserting and fixing leg piece that is releasably inserted into the inserting and fixing portion to be locked therein and having at the upper portion thereof a cord holding portion having a cord inserting port. These clamp holder and clamp pieces are formed from a non-rubber rigid material such as resin. This clamp for ignition cables is constructed such that clamp pieces are locked in an erect fashion in the clamp holder tightly wound around the body portion of the plug cap, and that ignition cables are inserted into the cord holding portions of the clamp pieces to be held in position therein.

In the clamp for ignition cables constructed, as described above, according to the present invention, since the clamp holder made from a non-rubber rigid material is tightly positioned around the ignition plug cap, and since ignition cables are inserted into and held in position in the clamp pieces made also from a non-rubber rigid material and locked in an erect fashion in the clamp holder, even if the frequency of the engine vibrations on the ignition plug side is different from that of vibrations of ignition cables that are magnified by the engine vibrations, the deterioration of the clamp due to the vibrating stress and heat generated in the high temperature atmosphere is prevented. In addition, even if the rubber plug cap deteriorates due to heat, the positional deviation of the clamp holder tightly wound around the outer circumference thereof can be prevented, thereby making it possible to obtain a stable ignition cable clamping function of the clamp. Furthermore, it is possible to quickly meet a need for changes in a wiring layout of ignition cables simply by exchanging and/or adding clamp pieces.

Figure 2A:
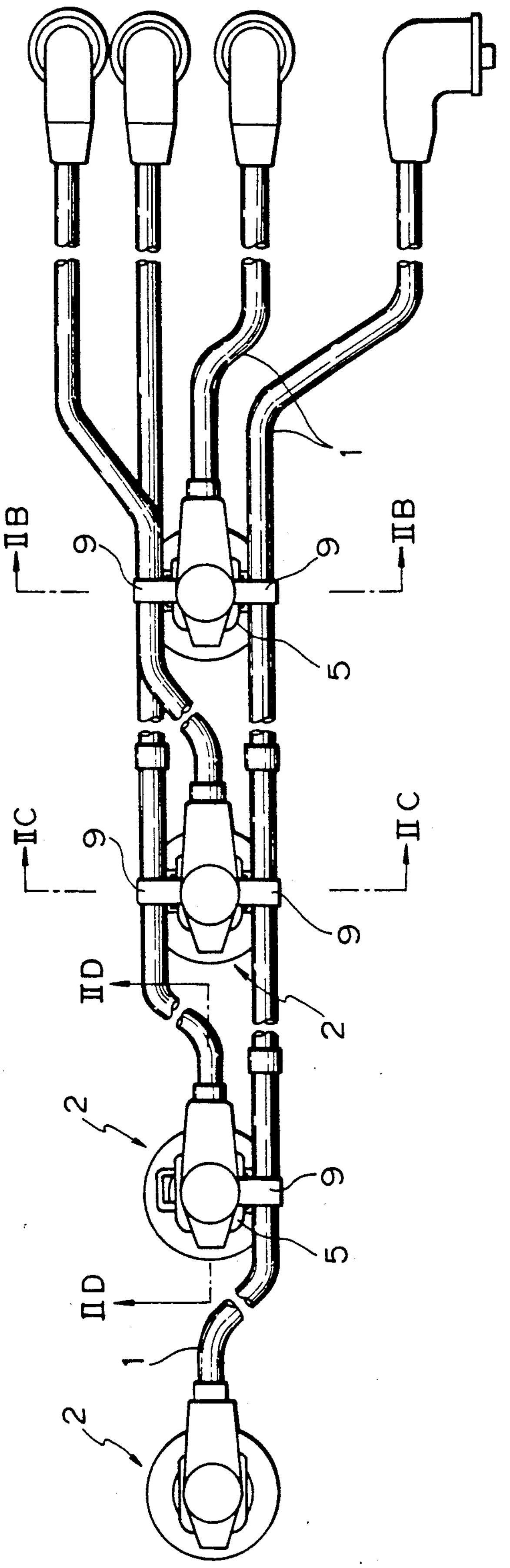
FIGS. 2A-2D show an arrangement in which the clamp according to the embodiment of the present invention shown in FIG. 1 is actually used, FIG. 2(A) being a plan view, FIG. 2(B) being a sectional side view taken along the line 2B—2B of FIG. 2(A), FIG. 2(C)
Figure 2D:
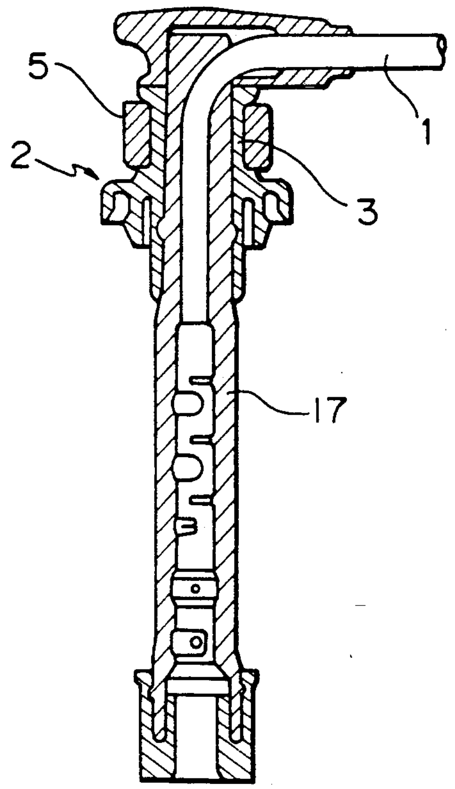
Figure 2C:
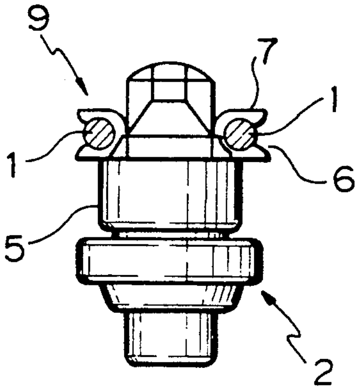
Figure 2B:
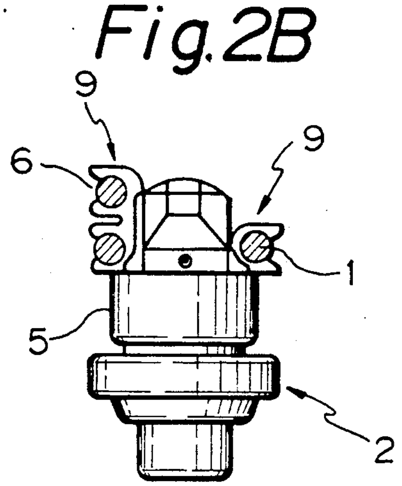

being a sectional side view taken along the line 3B—3B of FIG. 2(A), and FIG. 2(D) being a sectional side view taken along the line 2D—2D of FIG. 2(A).

DETAILED DESCRIPTION OF THE PREFERRED EMBODIMENTS

Figure 1A:
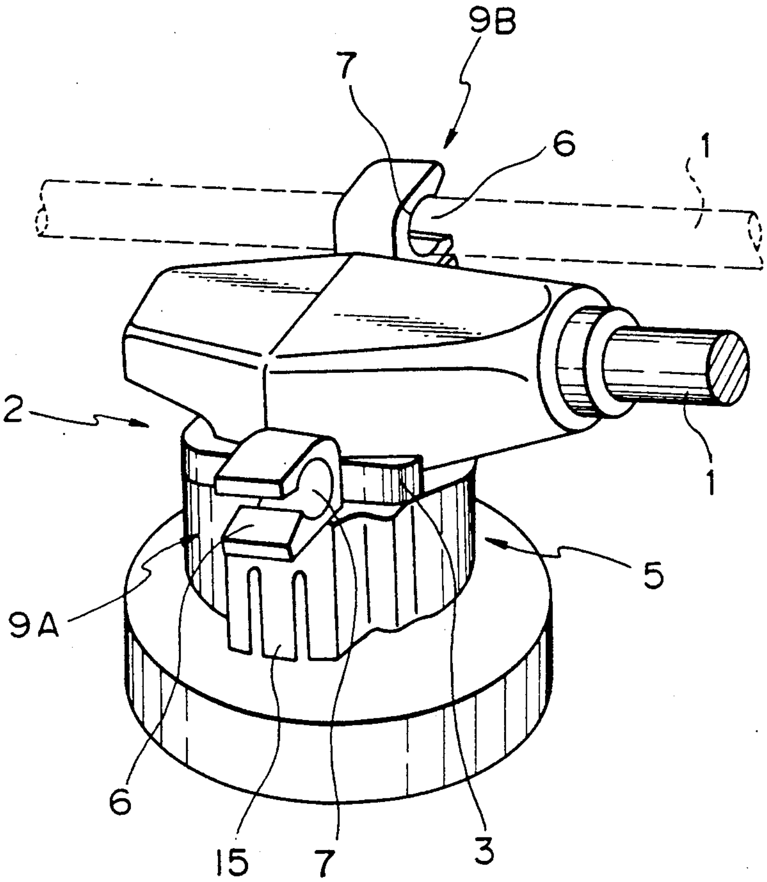
FIGS. 1A AND 1B shows one embodiment of a clamp for ignition cables according to the present invention, FIG. 1(A) being a perspective view of the clamp, and FIG. 1(B) being an exploded perspective view of the respective constituent members of the clamp.
Figure 1B:
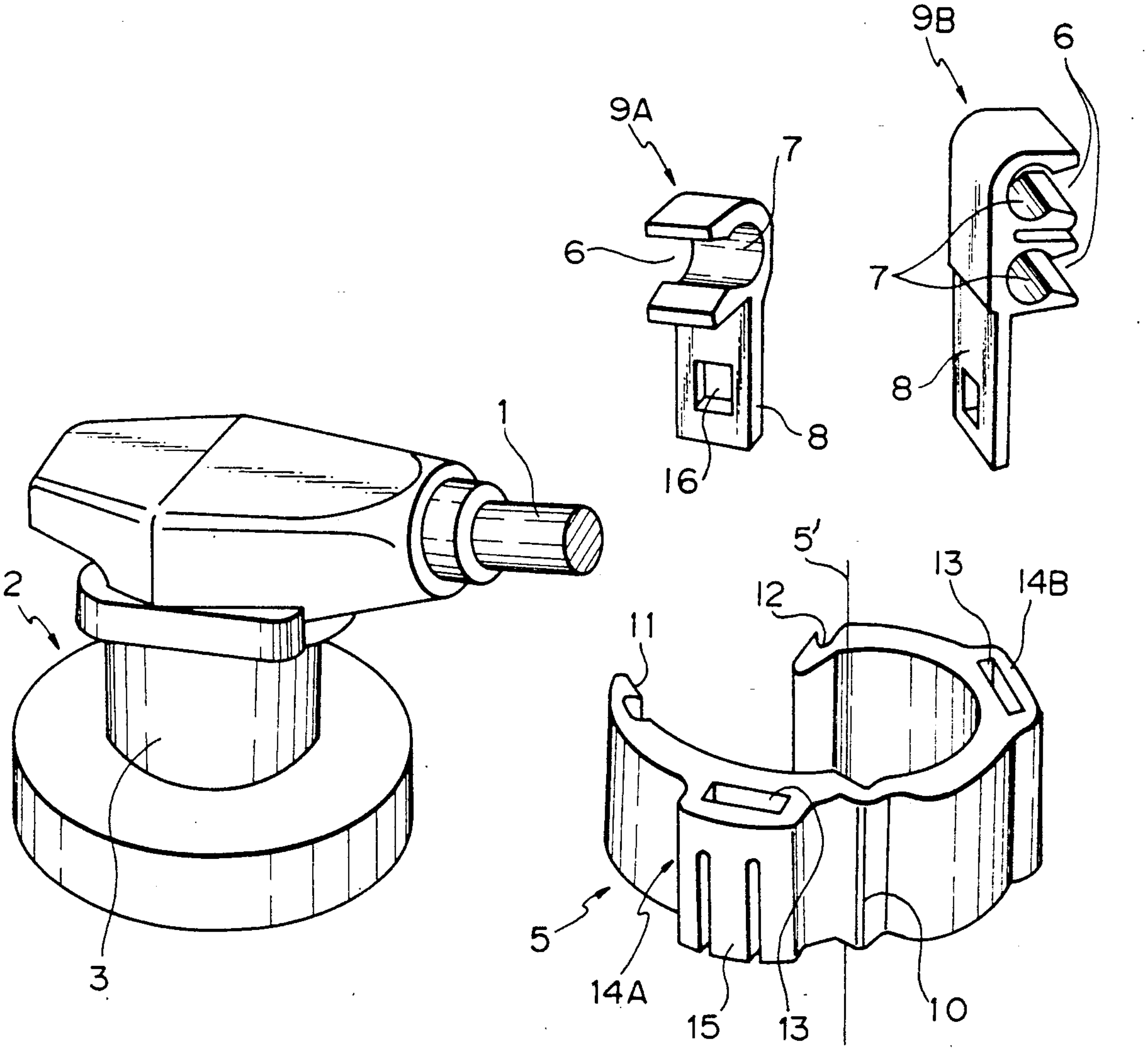

Referring to FIGS. 1 and 2, one embodiment of the present invention will now be described in detail. A clamp for ignition cables according to the present invention comprises a band-like clamp holder 5 adapted to be tightly engaged around the body portion 3 of a rubber plug cap 2 enclosing an ignition cable 1 at the end thereof at which it is connected to an ignition plug, and clamp pieces 9 (in the illustrated embodiment, there are two types of clamp pieces; one is a clamp piece 9A having a single cord holding portion 7, and the other is a clamp piece 9B having two cord holding portions 7) each having at the upper portion thereof a cord holding portion 7 having in turn a cord inserting port 6 and at the lower portion thereof a plate-like inserting and fixing leg piece 8. As shown in FIG. 1(A), the clamp pieces 9A, 9B are inserted into the clamp holder 5 tightly engaged around the body portion 3 of the plug cap 2 so as to be releasably fixed in position therein with the respective cord inserting ports 6 being faced outwardly, and other ignition cables 1 passing by the plug cap 2 are inserted into the cord holding portions 7 of the clamp pieces 9A, 9B that are fixedly provided in an erect fashion on the clamp holder 5 so as to be held in position therein, thus making it possible to put the wiring posture of ignition cables in good order, as well as holding the same in position.

To be more specific, the clamp holder 5 is shaped in the form of a band and is constructed such as to be freely folded at an intermediate position along the length thereof. A locking claw 11 is provided on one end of the band-like clamp holder 5, while a locking groove is formed in the other end of the same. This shape of the clamp holder 5 enables the clamp holder 5 to be tightly engaged around the body portion 3 of the plug cap 2 when the clamp holder 5 is closed so as to become an annular member by fitting the locking claw 11 in the locking groove 12 with a "snapping sound".

This clamp holder 5 has two inserting and fixing portions 14A, 14B provided around the outer circumference thereof, and a hole 13 is formed in each inserting and fixing portion in such a manner as to be in parallel with the vertical axis 5' of the annular member. These holes 13 are closed at one end thereof, and the inserting and fixing leg pieces 8 of the respective clamp pieces 9A, 9B are then received in these holes 13 so as to be fixed in position therein. A cantilever-like resilient locking piece 15 is formed in the central portion of the respective inserting and fixing portions 14A and 14B in such a manner as to extend parallel with the hole 13, and the lower end of each cantilever-like resilient pieces 15 is made free.

When the clamp pieces 9A, 9B are inserted down into their associated holes 13, a locking hole 16 formed in the respective inserting and fixing leg pieces 8 is brought into locking engagement with a locking portion (not shown) of the resilient locking piece 15 of the respective inserting and fixing portions 14A, 14B, thereby ensuring the firm fixation of the clamp pieces 9A, 9B in the respective holes 13. Thus, the clamp pieces 9A, 9B are prevented from easily coming out of the holes 13. In contrast, when the engagement between the resilient locking piece 15 and the inserting and fixing leg piece 8 is released, the respective clamp pieces 9A, 9B are easily removed from the clamp holder 5.

The two inserting and fixing portions 14A, 14B, are provided substantially at such positions as to become symmetrical with each other when the clamp holder 5 is closed at the ends thereof so as to effect an annular form. More specifically, the inserting and fixing portions 14A, 14B are provided on the clamp holder 5 at such positions as to be located on the side of the plug cap 2 when the clamp holder 5 is engaged around the body portion 3 of the plug cap 2, thereby preventing the interference between the inserting and fixing portions 14A, 14B and the ignition cable 1 of the plug cap 2 around which the clamp holder 5 is wound.

The clamp pieces 9A, 9B each have at the upper portion thereof the cord holding portion/portions 7 for receiving the ignition cable/cables 1 and holding the same in position therein, and these cord holding portions 7 each have the cord inserting port/ports 6 in which the ignition cable/cables 1 is/are received, and the clamp pieces 9A, 9B also have the plate-like inserting and fixing leg piece 8 at the lower portion thereof. This inserting and fixing leg piece 8 has the locking hole 16 with which the resilient locking piece 15 is brought into engagement. The clamp pieces 9A, 9B are inserted into the associated inserting and fixing portions 14A, 14B of the clamp holder 5 with the cord inserting ports 6 of the respective cord holding portions 7 being faced outwardly of the plug cap 2, and eventually the clamp pieces 9A, 9B so inserted are releasably fixed in position in an erect fashion.

The above-described clamp holder 5 and clamp pieces 9A, 9B are formed from a non-rubber rigid material (in this embodiment, nylon is used) so as to obtain suitable rigidity and heat resistance. In addition, in the plug cap 2 of this embodiment, as shown in FIG. 2(D), a tube 17 made from resin is additionally interposed between the plug cap 2 and the end portion of the ignition cable 1 enclosed in the former so as to improve the compression rigidity of the plug cap 2, thereby ensuring further the fixation of the clamp holder 5 tightly around the body portion 3 of the plug cap 2.

In the clamp for ignition cables comprising the above-described clamp holder 5 and clamp pieces 9A, 9B, as shown in FIG. 2(A), the clamp holder 5 is caused to be tightly engaged around each plug cap 2, and the clamp pieces 9 are inserted into and fixed in an erect fashion in the clamp holders 5 in such a manner as to achieve a required wiring layout of the ignition cables 1, and finally the ignition cables arranged in accordance with the required wiring layout are held and clamped by means of the cord holding portions 7 at an intermediate position along the length of the respective ignition cables 1.

With the clamp for ignition cables according to the embodiment shown in FIG. 1, since the clamp holder 5 adapted to be engaged around the body portion 3 of the plug cap 2 and clamp pieces 9 adapted to be inserted and releasably fixed in the clamp holder 5 are formed from a non-rubber rigid material, the whole of the clamp is given suitable rigidity and heat resistance. Consequently, even if the clamp is used in a high temperature atmosphere, and even if the frequencies of vibrations on the side of the ignition plug and of the ignition cable are different with the clamp being forced to serve as a point of contact between the two types of vibrations having frequencies different from each other, the clamp can endure heat generated in the high temperature atmosphere, as well as the vibrating stress, and cannot be affected by the synergistic effect produced when heat deterioration adds to vibrating stress deterioration. In addition, even if the body portion 3 of the rubber plug cap 2 is deteriorated with the outside diameter of the body portion 3 being reduced, the clamp holder 5 tightly engaged around the body portion 3 is prevented from easily deviating from its original position, thereby making it possible to maintain the stable clamping capability of the clamp for ignition cables 1. Furthermore, even if there is a need for changes in the wiring layout of a group of ignition cables, it is possible to promptly meet such a need by simply exchanging the clamp pieces.

As is clear from the above description, the clamp for ignition cables according to the present invention is advantageous in that the stable clamping function can continuously be enjoyed, that a need for changes in the wiring layout of the ignition cables can promptly be met, and that the performance of clamping ignition cables can further be improved.

What is claimed is:

1. A clamp for ignition cables comrprising: a band-like clamp holder adapted to be tightly engaged around the body portion of a rubber ignition plug cap enclosing therein one end of an ignition cable and having inserting and fixing portions formed on the outer circumference thereof, and a clamp piece having an inserting and fixing leg piece insertable into said inserting and fixing portion so as to be releasably fixed in position therein in a locking manner and having a cord holding portion with a cord inserting port at the upper portion of said cord holding portion, said clamp holder and clamp piece being formed from a non-rubber rigid material, said clamp piece being inserted into said clamp holder tightly engaged around said ignition plug cap so as to be locked in position in an erect fashion, whereby an ignition cable can be inserted into said cord holding portion so as to be held in position therein.

2. A clamp for ignition cables as set forth in claim 1, wherein said clamp holder is shaped in the form of a band that is free to be folded at an intermediate hinge portion thereof, a locking claw being formed at one end of said band-shaped clamp holder with a locking groove being formed at the other end of said clamp holder, said locking claw being designed to be releasably fitted in said locking groove, an inserting and fixing portion being formed on the outer circumference of said clamp holder, and a hole for receiving therein said inserting and fixing leg piece of said clamp piece being formed in said inserting and fixing portion.

3. A clamp for ignition cables as set forth in claim 2, wherein a cantilever-shaped resilient locking piece is formed in the central portion of said inserting and fixing portion in such a manner as to extend parallel with said hole, the lower end of said cantilever-shaped resilient locking piece being free.

4. A clamp for ignition cables as set forth in claim 1, wherein said clamp piece has a single or plurality of cord holding portions for receiving and holding ignition cables at the upper portion of said cord holding portions and an inserting and fixing leg piece at the lower portion thereof, said cord holding portions each having a cord inserting port from which an ignition cable is inserted thereinto.

5. A clamp ignition cables as set forth in claim 3, wherein said inserting and fixing leg piece has a locking hole designed to be brought into locking engagement with said resilient locking piece.

6. a clamp for ignition cables as set forth in claim 1, further comprising a tube made from resin interposed between said plug cap and the end portion of an ignition cable enclosed in said plug cap so as to improve the compression rigidity of said plug cap, thereby ensuring further the firm fixation of said clamp holder tightly wound around said body portion.

* * * * *

UNITED STATES PATENT AND TRADEMARK OFFICE

CERTIFICATE OF CORRECTION

PATENT NO. : 5,046,464

DATED : September 10, 1991

INVENTOR(S) : Masahiro HISATOMI et al.

It is certified that error appears in the above-identified patent and that said Letters Patent is hereby corrected as shown below:

On the title page Item [73], for "Nissan Motor Co.", read --Nissan Motor Co., Ltd.--.

Signed and Sealed this

Tenth Day of August, 1993

*Attest:*

MICHAEL K. KIRK

*Attesting Officer*

*Acting Commissioner of Patents and Trademarks*